United States Patent
Kosugi et al.

(10) Patent No.: US 9,679,596 B2
(45) Date of Patent: Jun. 13, 2017

(54) PROTECTION OF A MAGNETIC DISK UNIT ON A PORTABLE COMPUTING DEVICE

(71) Applicant: LENOVO (Singapore) PTE, LTD., New Tech Park (SG)

(72) Inventors: Kazuhiro Kosugi, Yokohama (JP); Takashi Yomo, Fujisawa (JP); Mamoru Okada, Yokohama (JP); Tomoaki Kosugi, Yokohama (JP)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 14/500,670

(22) Filed: Sep. 29, 2014

(65) Prior Publication Data

US 2015/0092297 A1    Apr. 2, 2015

(30) Foreign Application Priority Data

Sep. 27, 2013   (JP) ................. 2013-202523

(51) Int. Cl.
*G11B 19/04*     (2006.01)
*G11B 5/55*      (2006.01)
*G11B 5/596*     (2006.01)

(52) U.S. Cl.
CPC ........ *G11B 5/5582* (2013.01); *G11B 5/59694* (2013.01); *G11B 19/042* (2013.01); *G11B 19/043* (2013.01)

(58) Field of Classification Search
CPC ..... G11B 19/04; G11B 19/041; G11B 19/042; G11B 19/043; G11B 5/5582

USPC .................................. 360/75, 60; 702/141
See application file for complete search history.

(56) References Cited

U.S. PATENT DOCUMENTS

| | | | | |
|---|---|---|---|---|
| 6,580,574 B1* | 6/2003 | Codilian | ................ | G11B 21/12 360/60 |
| 6,603,620 B1* | 8/2003 | Berding | ................ | G11B 19/04 360/60 |
| 2005/0141127 A1* | 6/2005 | Shimotono | .......... | G01P 15/0891 360/75 |
| 2005/0154936 A1* | 7/2005 | Nagai | ................. | G11B 5/5582 714/5.11 |
| 2006/0103963 A1* | 5/2006 | Adapathya | ........... | G11B 5/5582 360/60 |

(Continued)

FOREIGN PATENT DOCUMENTS

| | | |
|---|---|---|
| JP | 2004146036 A | 5/2004 |
| JP | 2005190641 | 7/2005 |

(Continued)

*Primary Examiner* — Thomas Alunkal
(74) *Attorney, Agent, or Firm* — Kunzler Law Group

(57) ABSTRACT

A portable computing device prevents a magnetic disk unit protecting function from impairing usability for a user when the processor is used as a tablet PC. The portable computing device includes a magnetic disk unit, a magnetic disk unit protecting section operable when predicting an occurrence of an impact to carry out a magnetic disk unit protecting function for retracting a head of the magnetic disk unit, and a detecting section that detects whether a user is holding the portable computing device or not, and responsive to detecting that the user is holding the portable computing device, temporarily deactivating the magnetic disk unit protecting function.

18 Claims, 15 Drawing Sheets

(56) References Cited

U.S. PATENT DOCUMENTS

| | | | | |
|---|---|---|---|---|
| 2006/0136168 A1* | 6/2006 | Nakamura | ........... | G01P 15/0891 |
| | | | | 702/141 |
| 2006/0152842 A1* | 7/2006 | Pasolini | .............. | G01P 15/0891 |
| | | | | 360/75 |
| 2007/0086108 A1* | 4/2007 | Kuroki | ...................... | G11B 5/54 |
| | | | | 360/75 |
| 2007/0123324 A1* | 5/2007 | Sato | ...................... | G11B 5/5582 |
| | | | | 455/575.3 |
| 2007/0146924 A1* | 6/2007 | Nishioka | ............... | G06F 1/3221 |
| | | | | 360/75 |
| 2007/0225947 A1* | 9/2007 | Suzuki | ................ | G01P 15/0891 |
| | | | | 702/189 |
| 2007/0253091 A1* | 11/2007 | Jeansonne | ............ | G11B 19/042 |
| | | | | 360/75 |
| 2007/0253093 A1* | 11/2007 | Cook | ..................... | G11B 19/04 |
| | | | | 360/75 |
| 2009/0109303 A1* | 4/2009 | Ito | ......................... | G11B 19/043 |
| | | | | 348/231.9 |
| 2013/0342928 A1* | 12/2013 | Niiyama | .............. | G11B 19/042 |
| | | | | 360/6 |

FOREIGN PATENT DOCUMENTS

| | | | |
|---|---|---|---|
| JP | 2007052824 A | 3/2007 | |
| JP | 2007295393 A | 11/2007 | |
| JP | 2009054207 A | 3/2009 | |
| JP | 2011233142 A | 11/2011 | |
| JP | 2012033266 A | 2/2012 | |
| JP | 2013157055 A | 8/2013 | |
| WO | 01/04897 A1 | 1/2001 | |

* cited by examiner

PROTECTION OF A MAGNETIC DISK UNIT ON A PORTABLE COMPUTING DEVICE

FIELD

The present invention relates to a manner of protecting a magnetic disk unit of the portable computing device.

BACKGROUND

In a laptop computer (hereinafter, called a "laptop PC") or other portable computing device that a user can carry around, protecting the portable computing device from an impact when a user accidentally drops it while carrying it or operating it is a critical issue. In particular, a magnetic disk unit which is commonly used as a storage device in this type of portable computing device is vulnerable to impacts and vibrations because of its structure. It is therefore desirable to provide an effective protecting means for the magnetic disk unit.

A magnetic disk unit reads or writes data by causing a magnetic head to seek over a rotating magnetic disk. If the magnetic head collides with the magnetic disk upon an impact or vibration, the magnetic disk may be damaged, making part or all of the data unrecoverable. Some portable computing devices with magnetic disk units are equipped with a hard disk active protection system (APS) which detects vibrations and others by using an acceleration sensor or the like and, when predicting an occurrence of a severe impact on the portable computing device, makes the magnetic head retracted from above the magnetic disk, thereby improving the shock-proof properties of the magnetic disk unit.

A laptop PC is usually used at a relatively stable place, such as on a desktop or laptop. When the APS predicts the occurrence of an impact, it often leads to dropping of the laptop PC. It is therefore effective to retract the magnetic head.

In contrast, a tablet computer (hereinafter, called a "tablet PC") is often used while being held with a hand. In this state, the computer suffers small vibrations and tilts repetitively.

In the case where the APS is applied to a tablet PC as in the case of a laptop PC, the possibility cannot be ruled out that a vibration or tilt of the tablet PC that would not actually lead to dropping of the PC is detected and the magnetic head is retracted unnecessarily. If the APS makes the magnetic head retracted from above the magnetic disk each time a vibration or the like occurs in the tablet PC, it will rather impair the practical usability of the tablet PC.

SUMMARY

The present invention provides a portable computing device capable of being used as a tablet PC, the portable computing device including: a magnetic disk unit; a magnetic disk unit protecting section operable when predicting an occurrence of an impact to carry out a magnetic disk unit protecting function for retracting a head of the magnetic disk unit; and a detecting section which detects whether a user is holding the portable computing device or not; wherein in the case where the detecting section detects that the user is holding the portable computing device, the magnetic disk unit protecting section temporarily deactivates the magnetic disk unit protecting function.

According to one embodiment, in the event that the magnetic disk unit protecting section predicts the occurrence of an impact, in the case where the detecting section detects that the user is holding the portable computing device, the magnetic disk unit protecting section desirably deactivates the magnetic disk unit protecting function for a prescribed period and, after a lapse of the prescribed period, activates the magnetic disk unit protecting function.

Further, according to one embodiment, the detecting section desirably includes a contact-type proximity sensor arranged in a chassis of the portable computing device and, in response to the proximity sensor detecting a contact by the user, determines that the user is holding the portable computing device.

Further, according to one embodiment, the detecting section desirably includes a touch screen and, in response to the touch screen detecting a contact by the user, determines that the user is holding the portable computing device.

Further, according to one embodiment, the detecting section desirably includes a keyboard and, in response to detection of an input to the keyboard, determines that the user is holding the portable computing device.

The present invention provides a portable computing device capable of being used as a laptop PC and a tablet PC, the portable computing device including: a magnetic disk unit; and a magnetic disk unit protecting section operable, when predicting an occurrence of an impact, to carry out a magnetic disk unit protecting function for making a head of the magnetic disk unit retracted; wherein the magnetic disk unit protecting section differentiates conditions for carrying out the magnetic disk unit protecting function between the case where the processor is used as the laptop PC and the case where the processor is used as the tablet PC.

According to one embodiment, the portable computing device desirably further includes a detecting section which is operable, when the processor is used as the tablet PC, to detect whether a user is holding the portable computing device or not, wherein when the processor is used as the laptop PC, the magnetic disk unit protecting section keeps the magnetic disk unit protecting function active constantly, and when the processor is used as the tablet PC, in the case where the detecting section detects that the user is holding the portable computing device, the magnetic disk unit protecting section temporarily deactivates the magnetic disk unit protecting function.

Further, according one embodiment, when the processor is used as the tablet PC, in the event that the magnetic disk unit protecting section predicts the occurrence of an impact, in the case where the detecting section detects that the user is holding the portable computing device, the magnetic disk unit protecting section desirably deactivates the magnetic disk unit protecting function for a prescribed period and, after a lapse of the prescribed period, activates the magnetic disk unit protecting function.

Further, according to one embodiment, the detecting section desirably determines whether the user is holding the portable computing device or not, on the basis of a detection result of at least one of a proximity sensor, a touch screen, and a keyboard.

To solve the problems described above and achieve the object, there is provided a magnetic disk unit protecting method for a portable computing device, the processor including a magnetic disk unit and capable of being used as a tablet PC, the method including: a magnetic disk unit protecting step of, when predicting an occurrence of an impact, carrying out a magnetic disk unit protecting function for making a head of the magnetic disk unit retracted; and a detecting step of detecting whether a user is holding the portable computing device or not; wherein in the magnetic disk unit protecting step, in the case where it is detected in the detecting step that the user is holding the portable computing device, the magnetic disk unit protecting function is deactivated temporarily.

Also provided is a magnetic disk unit protecting method for a portable computing device, the processor including a magnetic disk unit and capable of being used as a laptop PC and a tablet PC, the method including a magnetic disk unit protecting step of, when predicting an occurrence of an impact, carrying out a magnetic disk unit protecting function for making a head of the magnetic disk unit retracted, wherein in the magnetic disk unit protecting step, conditions for carrying out the magnetic disk unit protecting function are differentiated between the case where the processor is used as the laptop PC and the case where the processor is used as the tablet PC.

Also provided is a computer-executable program installed in a portable computing device, the processor including a magnetic disk unit and capable of being used as a tablet PC, the program causing a computer to perform: a magnetic disk unit protecting step of, when predicting an occurrence of an impact, carrying out a magnetic disk unit protecting function for making a head of the magnetic disk unit retracted; and a detecting step of detecting whether a user is holding the portable computing device or not; wherein in the magnetic disk unit protecting step, in the case where it is detected in the detecting step that the user is holding the portable computing device, the magnetic disk unit protecting function is deactivated temporarily.

Also provided is a computer-executable program installed in a portable computing device, the processor including a magnetic disk unit and capable of being used as a laptop PC and a tablet PC, the program causing a computer to perform a magnetic disk unit protecting step of, when predicting an occurrence of an impact, carrying out a magnetic disk unit protecting function for making a head of the magnetic disk unit retracted, wherein in the magnetic disk unit protecting step, conditions for carrying out the magnetic disk unit protecting function are differentiated between the case where the processor is used as the laptop PC and the case where the processor is used as the tablet PC.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

A portable computing device and a method and computer-executable program for protecting a magnetic disk unit of the portable computing device will be described in certain embodiments below. It will be readily understood that the components of the present invention, as generally illustrated in the accompanying drawings, may be arranged and designed in a wide variety of different configurations. Therefore, the following more detailed description of the embodiments of the inventive device, method, and program is not intended to limit the scope of the claimed invention, but merely illustrates selected exemplary embodiments of the device, method, and program that are consistent with the claimed invention. One skilled in the relevant art will recognize that these embodiments can be practiced without one or more of the specific details, or with other methods, components, materials, etc.

Referring to FIGS. 1A to 1E, embodiments of the external configuration of a portable computing device according will be described. The portable computing device is of a so-called convertible type, which can be used as a laptop PC and a tablet PC.

Figure 1A:
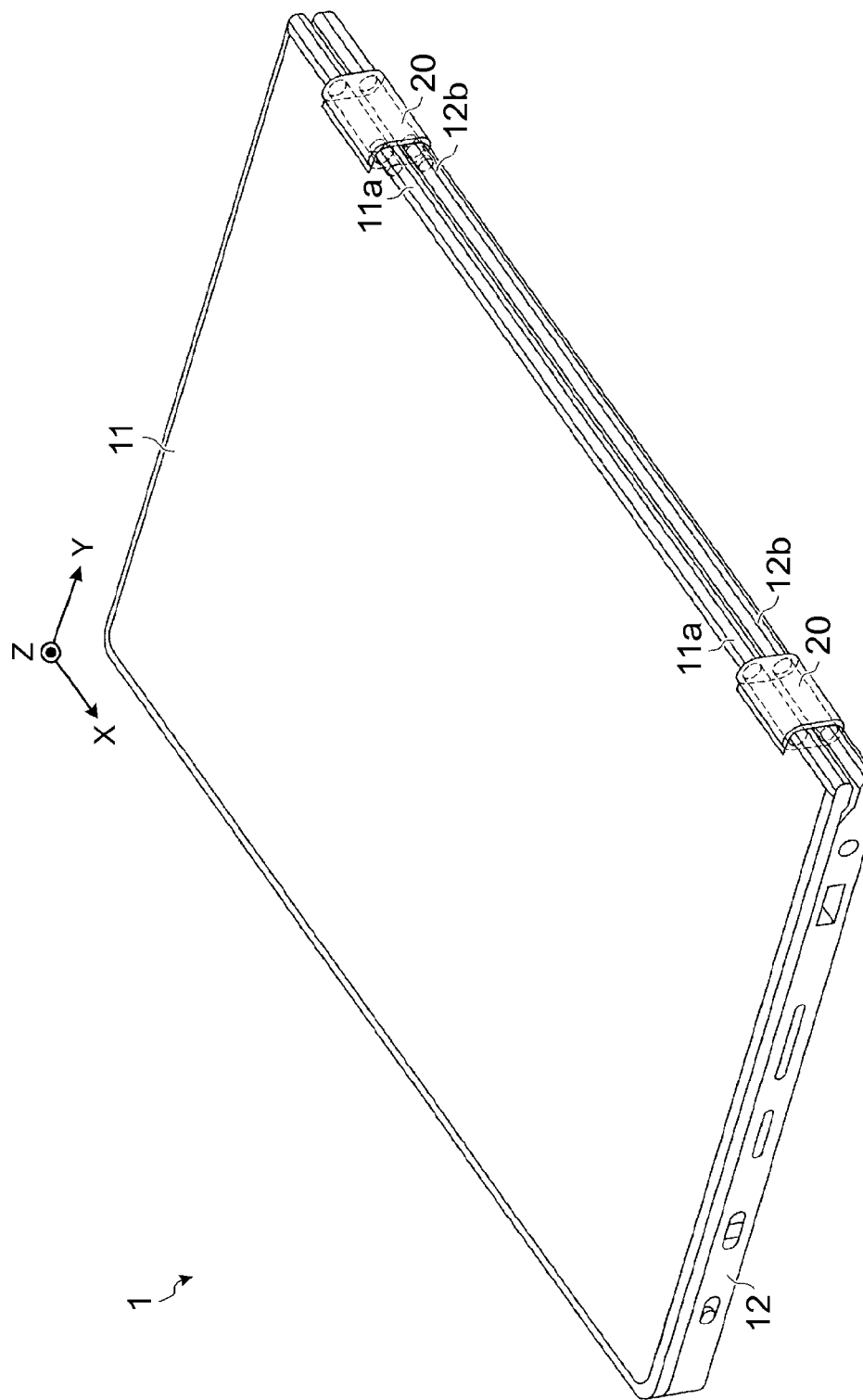
FIG. 1A is a perspective view of a portable computing device, in its closed position, according to an embodiment.
Figure 1B:
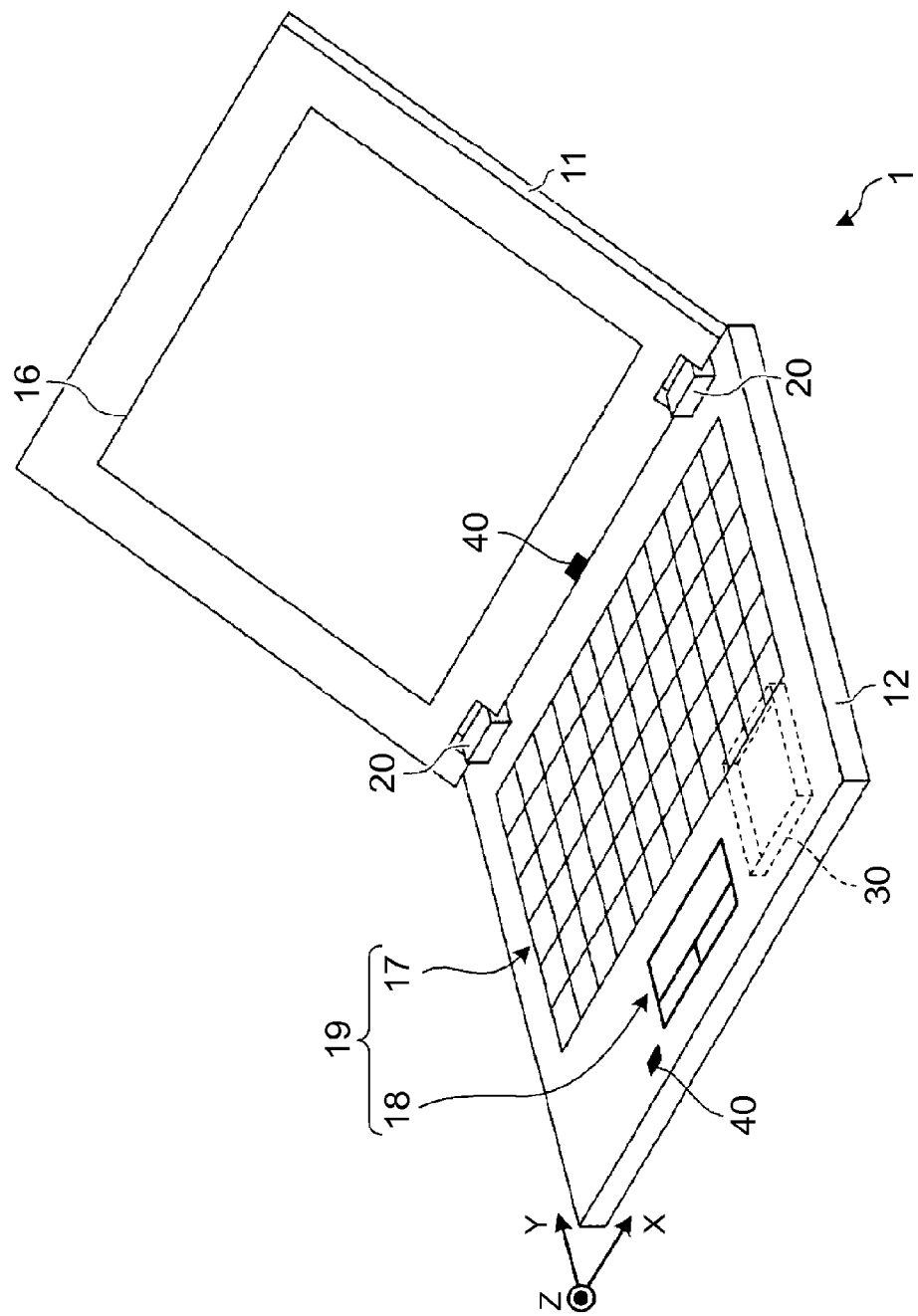
FIG. 1B is a perspective view of the portable computing device, in its open position, in the configuration of the embodiment shown in FIG. 1A.
Figure 1C:
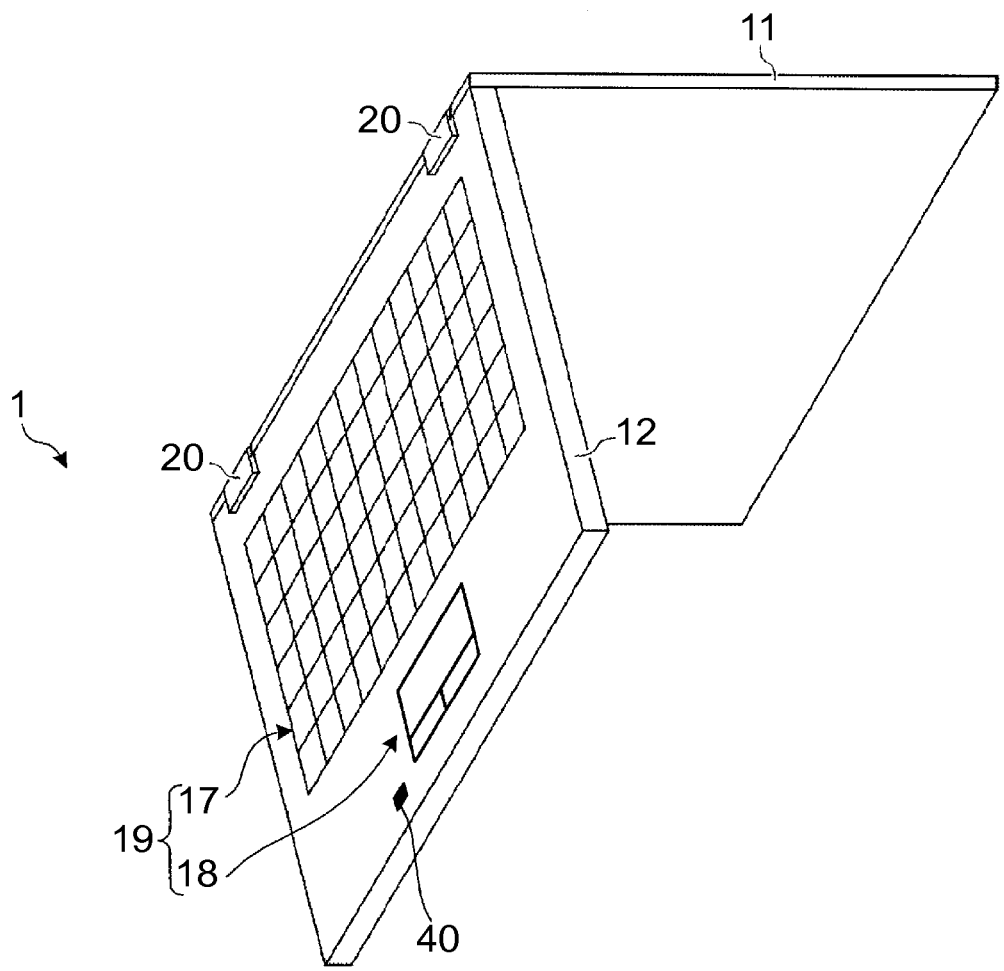
FIG. 1C is a perspective view of the portable computing device, in its open position, in the configuration of the embodiment shown in FIG. 1A.
Figure 1D:
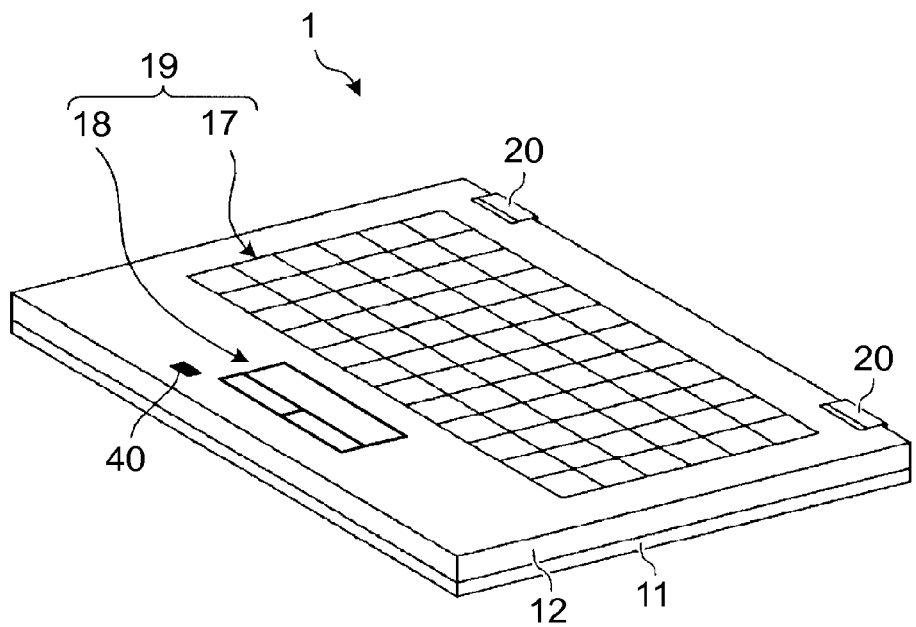
FIG. 1D is a perspective view of the portable computing device in another configuration of the embodiment shown in FIG. 1A, with its keyboard facing up.
Figure 1E:
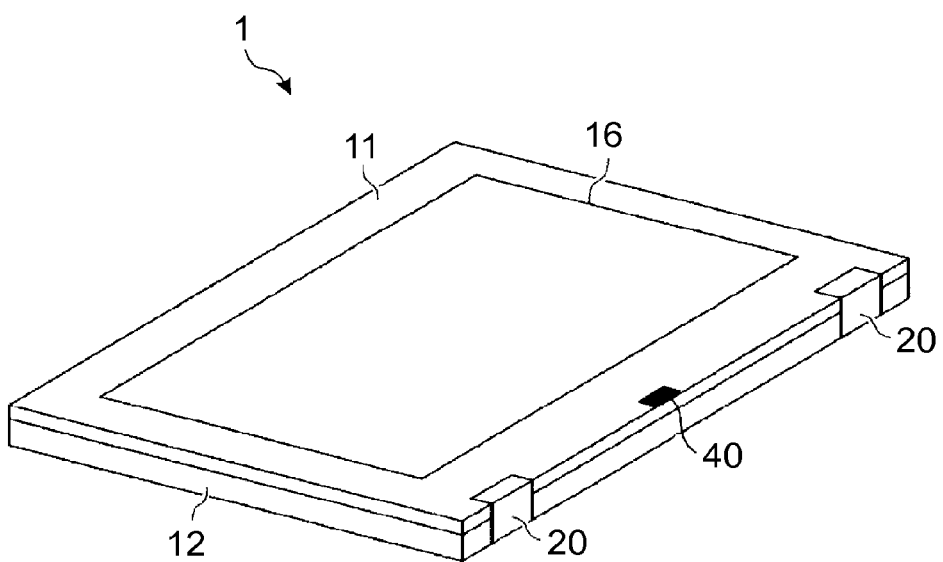
FIG. 1E is a perspective view of the portable computing device in the other configuration of the embodiment shown in FIG. 1A, with its touch screen facing up.

FIG. 1A is a perspective view of the portable computing device, in its closed position, according to one embodiment. FIG. 1B is a perspective view of the portable computing device, in its open position, in the configuration of the embodiment shown in FIG. 1A. FIG. 1C is a perspective view of the portable computing device, in its open position, in the configuration of the embodiment shown in FIG. 1A. FIG. 1D is a perspective view of the portable computing device in another configuration of the embodiment shown in FIG. 1A, with its keyboard facing up. FIG. 1E is a perspective view of the portable computing device in the other configuration of the embodiment shown in FIG. 1A, with its touch screen facing up.

As shown in FIGS. 1A to 1E, the portable computing device 1 includes a display-side chassis 11 and a body-side chassis 12. In the display-side chassis 11, a touch screen 16 is arranged which includes an LCD (see FIG. 2) and a touch sensor (see FIG. 2) disposed on the LCD. In the body-side chassis 12, an input unit 19 is arranged which includes a keyboard 17 and a touch pad 18. The display-side chassis 11 and the body-side chassis 12 are connected via a pair of hinges 20. The portable computing device 1 has a circuit board, including a CPU, within the body-side chassis 12.

When the portable computing device 1 is in the closed position as shown in FIG. 1A, the touch screen 16 faces the body-side chassis 12. The touch screen 16 is connected in such a way as to be controllable by the CPU, and presents data to a user of the portable computing device 1.

An end 11a of the display-side chassis 11 and an end 12b of the body-side chassis 12 are joined via the pair of hinges 20. The display-side chassis 11 can be rotated about the pair of hinges 20, with respect to the body-side chassis 12. The display-side chassis 11 can be rotated by substantially 360 degrees (about the X axis) with respect to the body-side chassis 12.

FIGS. 1B to 1D illustrate operation examples of the display-side chassis 11 which can be opened at different angles with respect to the body-side chassis 12. FIG. 1E further shows the touch screen 16 facing upward. This allows a user to write on or tap on the touch screen 16 using a finger or other pointer, for example.

In the state shown in FIG. 1B, the portable computing device 1 having the above configuration is in a laptop PC mode. A user can use it as an ordinary laptop PC by operating the input unit 19. Further, as shown in FIGS. 1D and 1E, when the display-side chassis 11 is rotated by 360 degrees with respect to the body-side chassis 12 and the display-side chassis 11 is stuck on the body-side chassis 12 to make the touch screen 16 face front, then the portable computing device 1 enters a tablet PC mode. In the tablet PC mode, a user can hold the portable computing device 1 with his/her hand and use it by operating the touch screen 16. For example, the CPU can switch the mode between the laptop PC mode and the tablet PC mode by detecting the rotational angle of the display-side chassis 11 with respect to the body-side chassis 12 by a sensor (not shown).

Further, as shown in FIG. 1B, a HDD (magnetic disk unit) 30 is disposed inside the body-side chassis 12. An acceleration sensor is also disposed in the body-side chassis 12, inside or outside the HDD 30. Further, of a pair of proximity sensors 40 provided, one proximity sensor 40 is disposed on a surface of the body-side chassis 12 on which the input unit 19 is arranged, in a position below the touch pad 18. The other proximity sensor 40 is disposed on a surface of the display-side chassis 11, in an approximately central position below the touch screen 16. Each proximity sensor 40 is a capacitance type contact detecting device, for example, and it detects a touch by a user. The proximity sensors 40 are disposed in the positions where a user is likely to grab and hold the portable computing device 1 when using it in the tablet PC mode.

The portable computing device 1 is provided with an APS (i.e. a magnetic disk unit protecting function) for protecting the HDD 30 from impacts, as will be described in detail later. The APS, when predicting the occurrence of an impact on the HDD 30, makes the head retracted to prevent it from crashing onto the disk.

When a user uses a tablet PC, the user often holds it with his/her hand. Therefore, the body of a tablet PC suffers more vibrations and tilts than a laptop PC. While the vibrations and tilts may accompany dropping of the device body, usually, they occur within the range of normal use by the user. If the APS is executed in a tablet PC using the same algorithm as in a laptop PC, the head may be retracted even with a vibration or tilt not accompanying the dropping of the device body, thereby impairing the usability for a user.

In view of the foregoing, according to the present embodiment, the APS uses different algorithms in the laptop PC mode and the tablet PC mode. More specifically, in the laptop PC mode, the APS is active constantly. On the other hand, in the tablet PC mode, when the state where the device body is being held by a user is detected, it is determined that the user is using the portable computing device 1 while holding it with his/her hand, and the APS is temporarily deactivated, so as not to impair the usability for the user in the tablet PC mode.

Here, the state where the device body is being held by a user is detected on the basis of any of the following: detection of contact by the proximity sensor 40, detection of touch by the touch screen 16, and detection of input by the keyboard 17 and the touch pad 18 in the input unit 19.

In the case of using the processor in the tablet PC mode, as shown in FIG. 1E, the touch screen 16 on the display-side chassis 11 is on the front side, while the input unit 19 on the body-side chassis 12 is on the back side. Therefore, in the case where a user is holding the portable computing device 1, the user often holds it by supporting the input unit 19 with his/her hand. Accordingly, it is determined that the user is holding the portable computing device 1 when the proximity sensor 40 detects a contact by a user, when the touch screen 16 detects a touch by a user, or when the keyboard 17 or the touch pad 18 of the input unit 19 is pressed.

Figure 2:
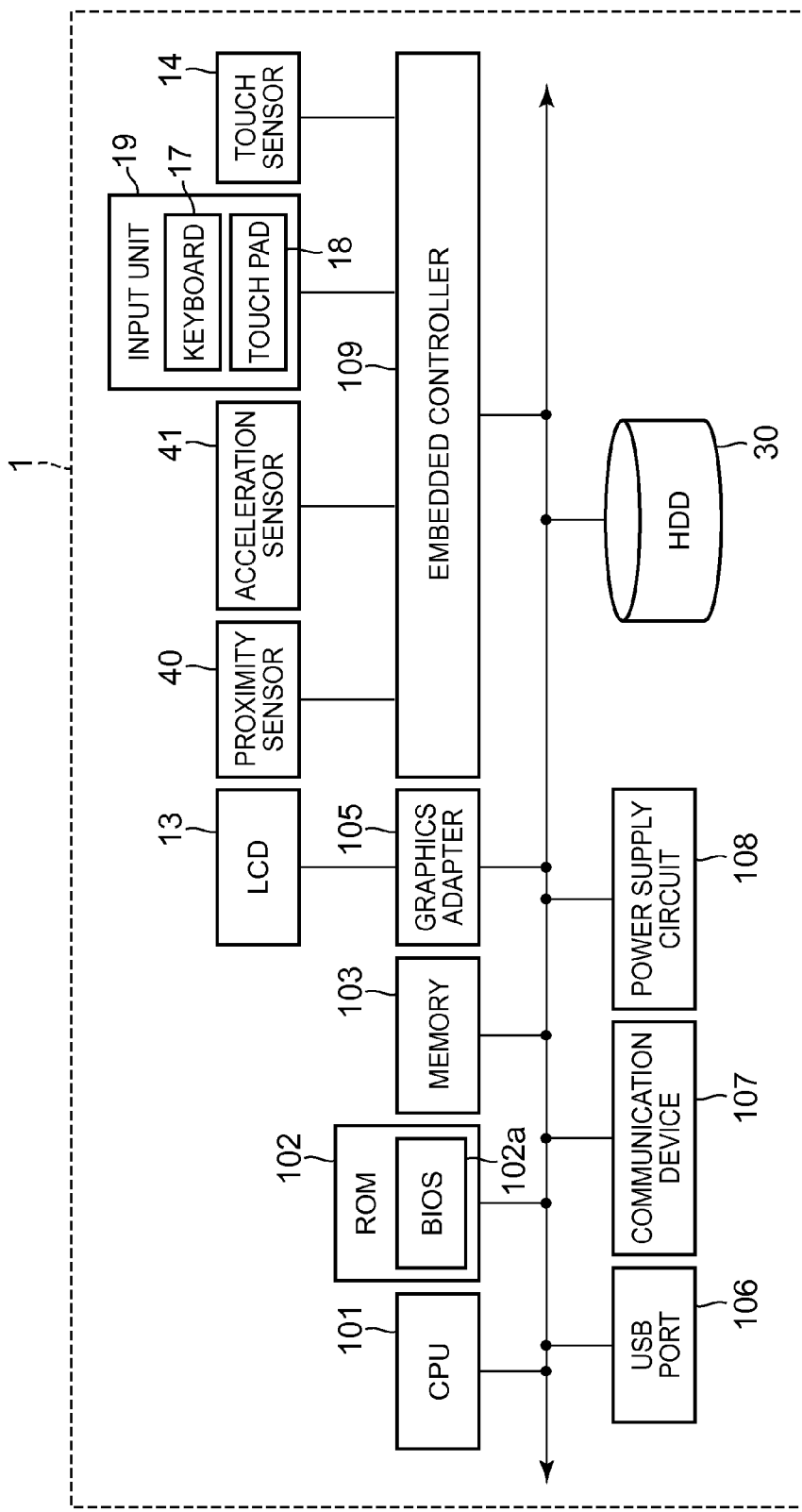
FIG. 2 is a schematic diagram showing the hardware configuration of the portable computing device.

FIG. 2 is a schematic diagram showing the hardware configuration of the portable computing device 1 described above. As shown in FIG. 2, the portable computing device 1 includes a CPU 101, a ROM 102, a memory 103, an LCD 13, a graphics adapter 105, a HDD 30, a proximity sensor 40, an acceleration sensor 41, a touch sensor 14, an input unit 19, an embedded controller 109, a USB port 106, a communication device 107, and a power supply circuit 108, which are directly or indirectly connected to one another via a bus.

The CPU 101 carries out an overall control of the portable computing device 1 by an OS which is stored in the HDD 30 connected to the CPU 101 via the bus. The CPU 101 also performs processing on the basis of various programs stored in the HDD 30. The ROM 102 stores a basic input/output system (BIOS) 102a and data.

The memory 103, including a cache memory or a RAM, is a writable memory and is used as an area into which a program executed by the CPU 101 is read and also as a work area into which data processed by the executing program is written.

The HDD 30 stores an OS, such as Windows (registered trademark), iOS (registered trademark), or Android (registered trademark), for carrying out an overall control of the portable computing device 1, various drivers for operating the hardware of the peripheral devices, an application dedicated to a specific task, and various data and files.

The graphics adapter 105 is operable, under the control of the CPU 101, to convert display information into video signals and output the converted video signals to the LCD 13. The LCD 13 is operable, under the control of the CPU 101, to display various kinds of information.

The communication device 107 controls communications with other devices via a network. The power supply circuit 108 includes an AC adapter, an intelligent battery, a charger for charging the intelligent battery, and a DC/DC converter, and is operable, under the control of the CPU 101, to supply electric power to various devices.

The proximity sensor 40 is a capacitance type contact detecting device, for example, and detects a touch by a user. The proximity sensor 40 outputs the detection signal to the embedded controller 109. The acceleration sensor 41 detects accelerations in three axes (X, Y, and Z axes), and outputs the acceleration information to the embedded controller 109.

The input unit 19 includes a keyboard 17 having various keys used for inputting characters and commands, and a touch pad 18 as a pointing device which moves the cursor on the screen. The keyboard 17 conforms to a prescribed standard, and outputs the information on the operated keys to the embedded controller 109. The touch pad 18 outputs the coordinate information of the operated positions to the embedded controller 109.

The touch sensor 14 is a capacitance type touch sensor, for example. It detects the position touched by a user and outputs the detected position to the embedded controller 109. The touch sensor 14 is a user interface for a user to input operations. It allows the user to perform input operations by selecting screen objects such as various menus, icons, buttons, and keyboard displayed on the screen of the LCD 13, perform text input operations, and perform scroll, swipe, and other screen operations.

The embedded controller 109 has a processor which executes programs stored in the ROM and the like to carry out various kinds of processing. The embedded controller 109 controls the operations of the proximity sensor 40, the acceleration sensor 41, the input unit 19, and the touch sensor 14.

Figure 3:
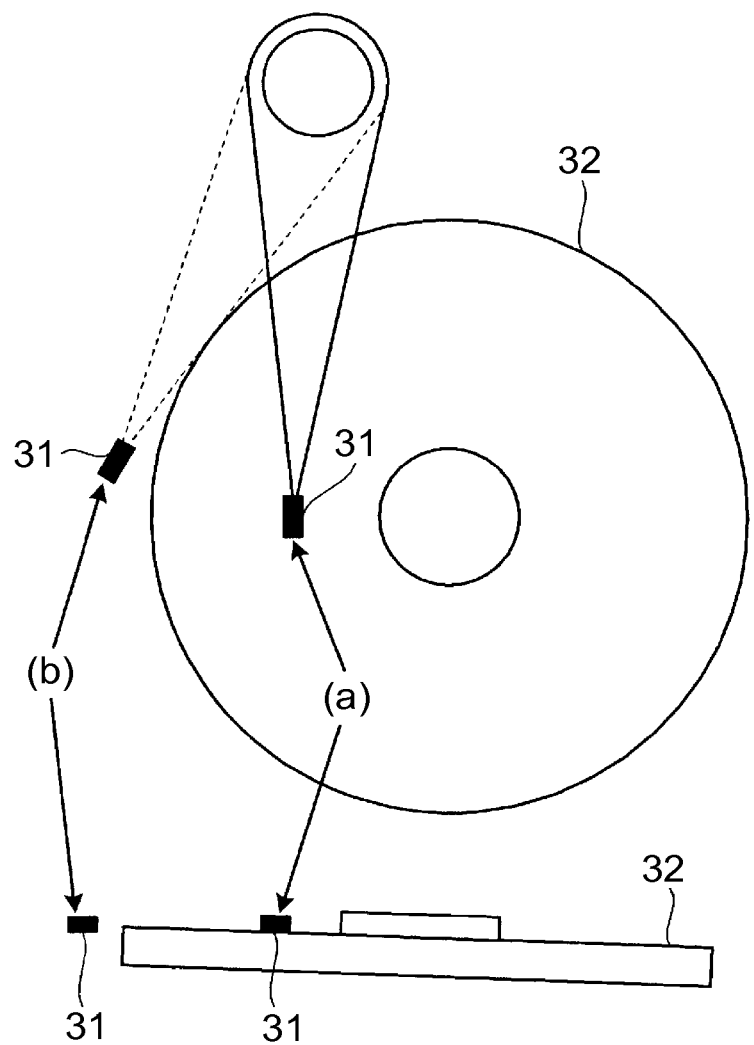
FIG. 3 schematically shows an ordinary device configuration of a HDD.

FIG. 3 schematically shows an ordinary device configuration of the HDD 30. The HDD 30, because of its structure, has a higher tolerance to impacts and vibrations in the state where a magnetic head 31 is placed in a prescribed retract position apart from above a magnetic disk 32 (unloaded state; position (b)), than in the state where the magnetic head 31 is operating over the magnetic disk 32 (loaded state; position (a)) for reading or writing data. Therefore, in the occurrence of a large impact on the portable computing device 1, when the magnetic head 31 is retracted from above the magnetic disk 32 to a ramp structure (not shown) in advance, the shock-proof properties of the HDD 30 can be improved. The most common cases where the portable computing device 1 suffers a large impact include the case where a user using the portable computing device 1 drops it from the desktop or laptop, and the case where the user using the processor while holding it with his/her hand drops it from the hand. Therefore, when signs of dropping of the portable computing device 1 are detected, before the impact of the dropping actually takes place, the magnetic head 31 is retracted from above the magnetic disk 32, to thereby protect the HDD 30.

Figure 4:
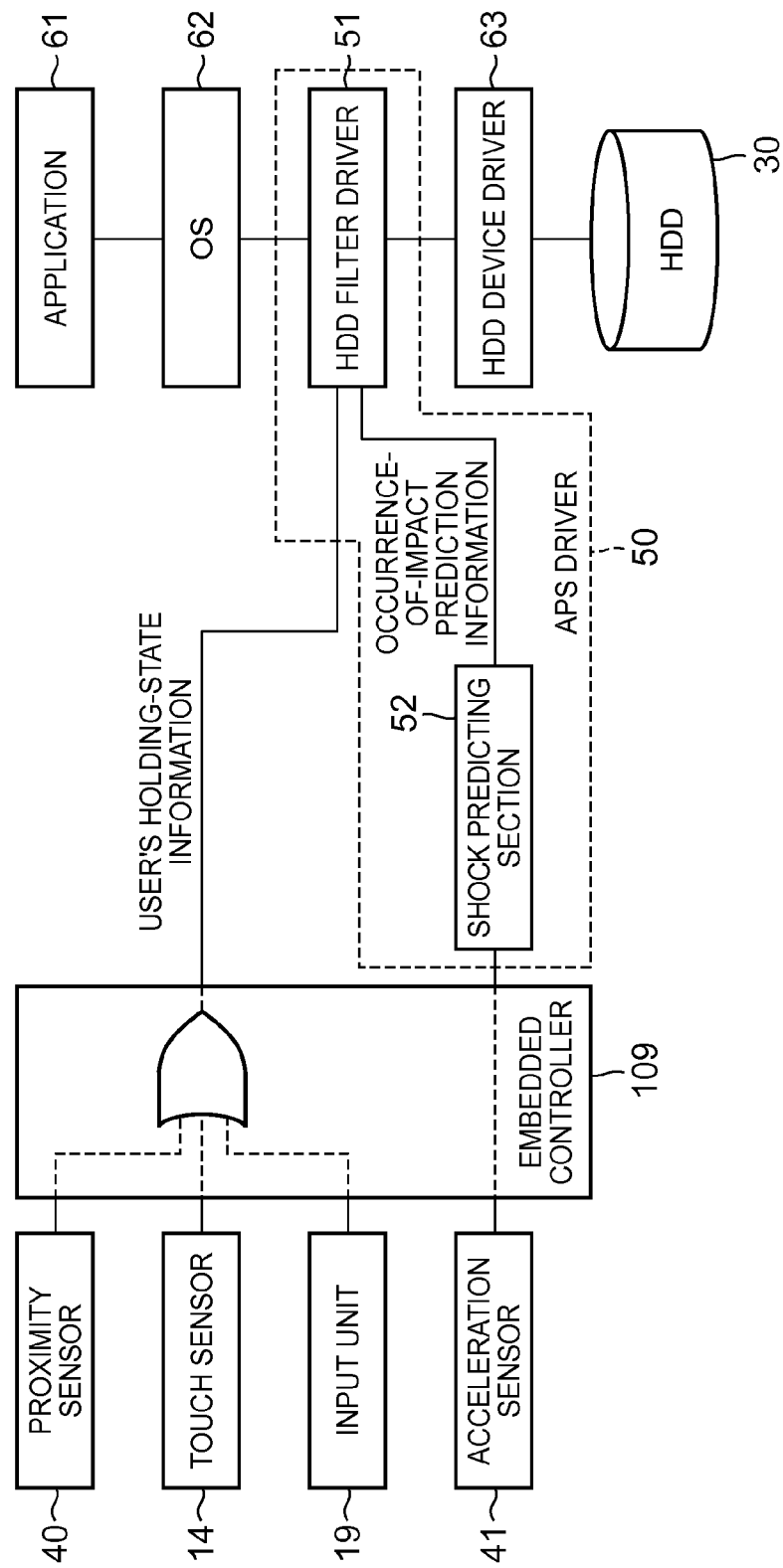
FIG. 4 shows a schematic functional configuration related to the APS for the HDD.

FIG. 4 shows a schematic functional configuration related to the APS for the HDD 30. In FIG. 4, an application 61, an OS 62, an APS driver 50, and a HDD device driver 63 are read from the HDD 30 to the memory 103 by the CPU 101, for execution.

The application 61 accesses the HDD 30 for reading or recording data, via the OS 62. The OS 62 manages the data recorded on the HDD 30. The OS 62 creates a file allocation table (FAT) and directory, and manages the data recording, reading, deletion, and movement relative to the HDD 30.

The embedded controller 109 outputs acceleration information input from the acceleration sensor 41, to a shock predicting section 52 in the APS driver 50. In the tablet PC mode, the embedded controller 109 outputs user's holding-state information, indicating whether the user is holding the device body or not (for example, "1" when the user is holding the device body, or "0" when the user is not holding the device body), to a HDD filter driver 51 in the APS driver 50. The embedded controller 109 determines that the user is holding the device body in the case where there is at least one of: a user touch to the proximity sensor 40, a user touch to the touch sensor 14, and an input to the keyboard or touch pad of the input unit 19. While it has been configured to detect a user touch to the proximity sensor 40, a user touch to the touch sensor 14, and an input to the keyboard and touch pad of the input unit 19 to determine the user's device-holding state, it may be configured to detect at least one of the above.

The APS driver 50 includes the shock predicting section 52 and the HDD filter driver 51. The shock predicting section 52 analyzes the acceleration information obtained by the acceleration sensor 41 to analyze the vibration or tilt of the device body, and determines the state of the HDD 30 to thereby predict the occurrence of an impact (dropping or the like). The shock predicting section 52 outputs impact prediction information (for example, "1" when predicting the occurrence of an impact, or "0" when not predicting the occurrence thereof), to the HDD filter driver 51.

The HDD filter driver 51 controls the operation of the HDD 30 via the HDD device driver 63, in accordance with an instruction by the OS 62. Further, the HDD filter driver 51 loads and unloads the head 31 of the HDD 30. The HDD filter driver 51 performs different APS controls on the HDD 30 in the laptop PC mode and the tablet PC mode. In the laptop PC mode, the HDD filter driver 51 makes the head 31 retracted, on the basis of the impact prediction information input from the shock predicting section 52. More specifically, in the laptop PC mode, the HDD filter driver 51 outputs a retract command when the impact prediction information input from the shock predicting section 52 is "1".

On the other hand, in the tablet PC mode, the HDD filter driver 51 makes the head 31 retracted, on the basis of the impact prediction information input from the shock predicting section 52 and the user's holding-state information input from the embedded controller 109. That is, in the tablet PC mode, in the case where the user's holding-state information is "1", the HDD filter driver 51 temporarily deactivates the APS and then activates the APS. More specifically, in the tablet PC mode, when the impact prediction information is "1", in the case where the user's holding-state information is "1", the HDD filter driver 51 deactivates the APS for a prescribed period T and, after a lapse of the prescribed period T, activates the APS and outputs a retract command. The prescribed period T may be set to an arbitrary value, as will be described later.

The HDD device driver 63 controls the operation of the HDD 30 and data transfer, under the control of the HDD filter driver 51. When the HDD 30 receives a retract command from the HDD filter driver 51 via the HDD device driver 63, the HDD 30 retracts the head 31 to the ramp structure in preparation for an impact, to thereby protect the data and the magnetic disk 32 from the impact. During the period in which the head 31 is retracted and held in the ramp structure, a command issued by the CPU 101 to access the HDD 30 is not executed.

The HDD filter driver 51 creates a queue in the memory 103 for queuing the commands which are transmitted for accessing the HDD 30 after the retract command was generated. When the retract command is withdrawn, the HDD filter driver 51 transmits the queued commands to the HDD device driver 63.

Figure 5:
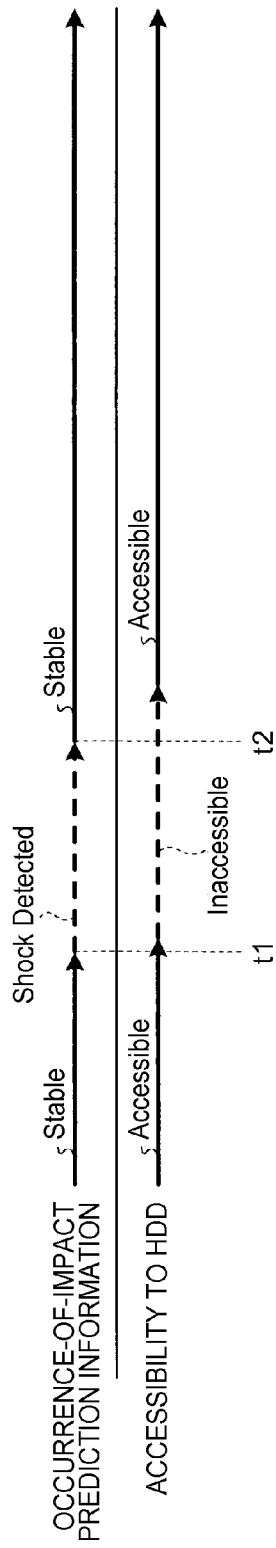
FIG. 5 is an exemplary timing chart illustrating the APS control in a laptop PC mode.
Figure 6:
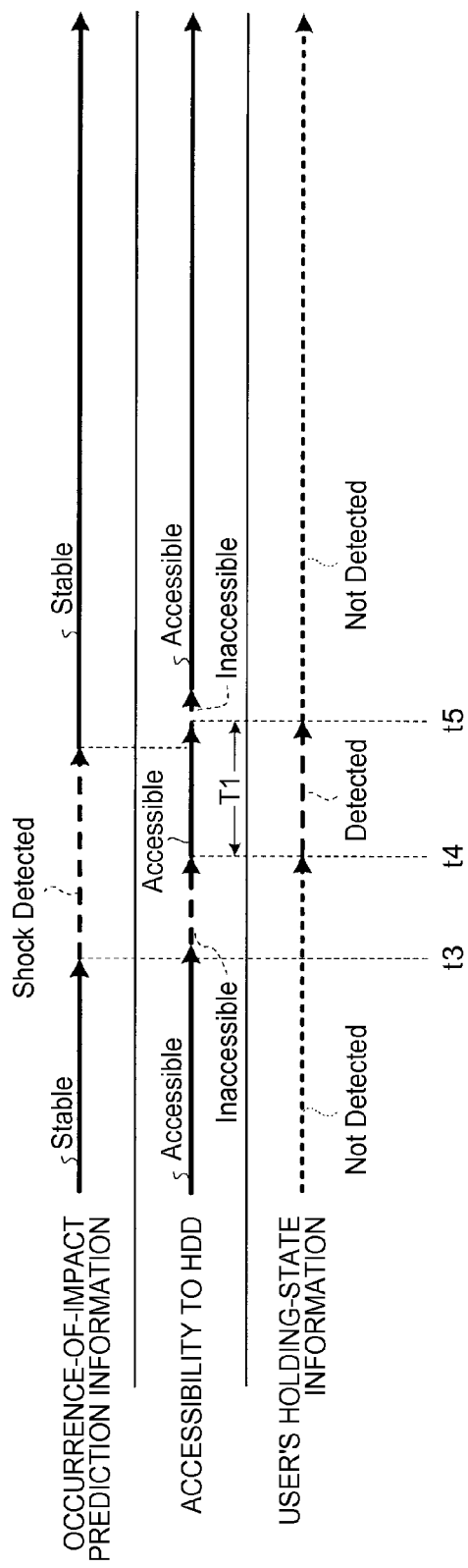
FIGS. 6 to 8 show exemplary timing charts illustrating the APS control in a tablet PC mode.
Figure 7:
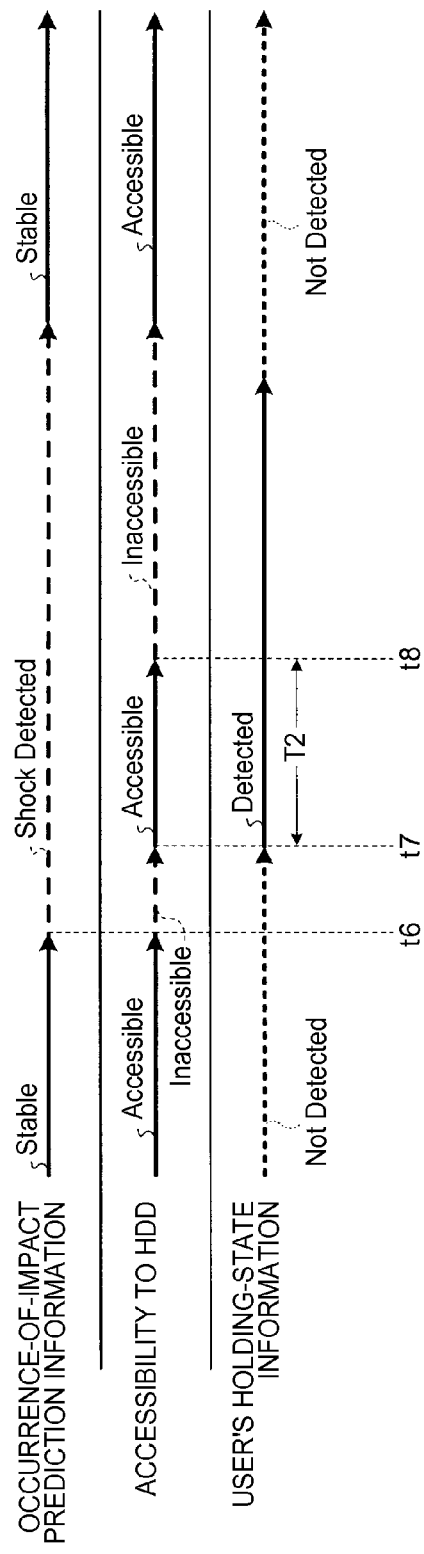
Figure 8:
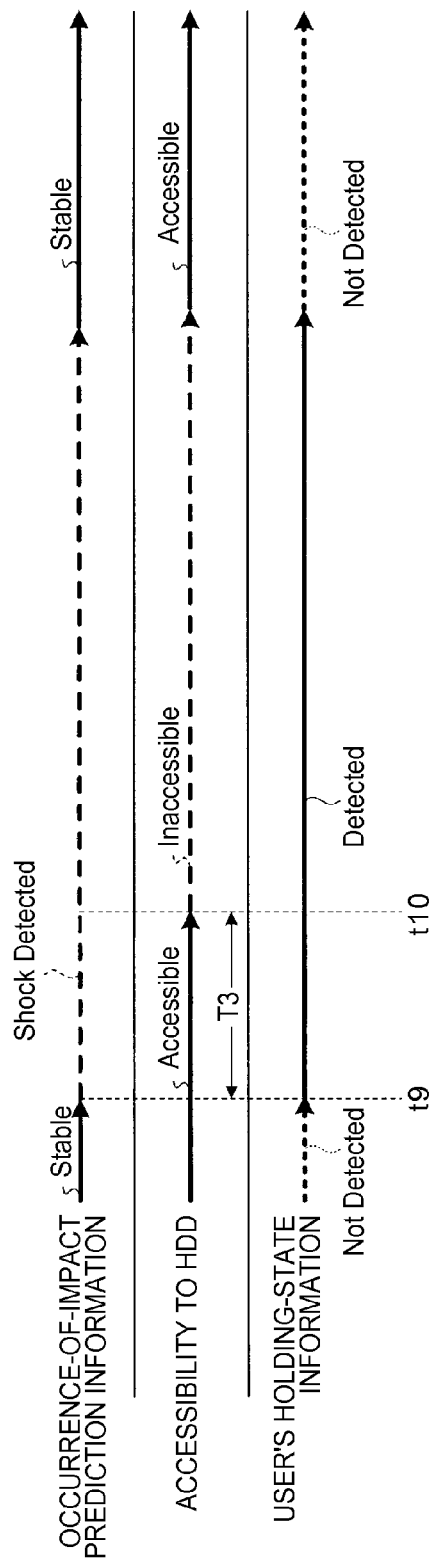

FIG. 5 is an exemplary timing chart illustrating the APS control in the laptop PC mode. FIGS. 6 to 8 are exemplary timing charts illustrating the APS control in the tablet PC mode.

Referring to FIG. 5, an example of the APS control in the laptop PC mode will be described. Shown in FIG. 5 are impact prediction information (for example, "Shock Detected" when the occurrence of an impact is predicted, and "Stable" when the occurrence of an impact is not predicted), and accessibility to the HDD (for example, "Accessible" when the HDD can be accessed, and "Inaccessible" when the HDD cannot be accessed).

In FIG. 5, the HDD 30 is accessible as long as the occurrence of an impact is not predicted. When the APS driver 50 predicts the occurrence of an impact (t1), it makes the head 31 of the HDD 30 retracted. As a result, the HDD 30 becomes inaccessible. When the occurrence of an impact is no longer predicted (t2), the APS driver 50 cancels the retraction of the head 31. As a result, the HDD 30 becomes accessible.

Referring to FIGS. 6 to 8, examples of the APS control in the tablet PC mode will be described. Shown in FIGS. 6 to 8 are the impact prediction information (for example, "Shock Detected" when the occurrence of an impact is predicted, and "Stable" when the occurrence of an impact is not predicted), the accessibility to the HDD (for example, "Accessible" when the HDD can be accessed, and "Inaccessible" when the HDD cannot be accessed), and user's holding-state information (for example, "Detected" when the user is holding the device body, and "Not Detected" when the user is not holding the device body).

In FIG. 6, the HDD 30 is accessible as long as the occurrence of an impact is not predicted. When the APS driver 50 predicts the occurrence of an impact (t3), it makes the head 31 of the HDD 30 retracted. As a result, the HDD 30 becomes inaccessible. While the head 31 is being retracted, when it is detected that the user is holding the device body (t4), the APS driver 50 deactivates the APS and cancels the retraction of the head 31 of the HDD 30 during a period T1 in which the user's device-holding state is being detected. As a result, the HDD 30 becomes accessible. When the user's device-holding state is no longer detected (t5), the APS driver 50 activates the APS and makes the head 31 of the HDD 30 retracted.

For example, an upper duration limit $T_{upper}$ for the period during which the APS is deactivated may be set, and in the case where the period during which the user is holding the device body is equal to or shorter than the upper duration limit $T_{upper}$, the APS may be deactivated during the period in which the user is holding the device body. In the case where the period during which the user is holding the device body is longer than the upper duration limit $T_{upper}$, the APS may be deactivated only for the period corresponding to the upper duration limit $T_{upper}$.

In FIG. 7, the HDD 30 is accessible as long as the occurrence of an impact is not predicted. When the APS driver 50 predicts the occurrence of an impact (t6), it makes the head 31 of the HDD 30 retracted. As a result, the HDD 30 becomes inaccessible. When it is detected that the user is holding the device body (t7), the APS driver 50 deactivates the APS and cancels the retraction of the head 31 of the HDD 30 during a period T2. After a lapse of the period T2 (t8), the APS driver 50 activates the APS and makes the head 31 of the HDD 30 retracted.

In FIG. 8, the HDD 30 is accessible as long as the occurrence of an impact is not predicted. In the case where the APS driver 50 predicts the occurrence of an impact approximately at the same time as the detection of the user's device-holding state (t9), the APS driver 50 deactivates the APS during a period T3. After a lapse of the period T3 (t10), the APS driver 50 activates the APS and makes the head 31 of the HDD 30 retracted. As a result, the HDD 30 becomes inaccessible.

As described above, according to the present embodiment, in the APS driver 50, the HDD filter driver 51 performs different APS controls on the HDD 30 in the laptop PC mode and the tablet PC mode. In the laptop PC mode, the APS is kept active constantly. In the case where the portable computing device 1 is used as a tablet PC, when the state of the processor being held by a user is detected, the APS is temporarily deactivated. Accordingly, in the case where the processor is used as a tablet PC, the time during which the HDD 30 is accessible becomes longer than in the case where the processor is used as a laptop PC. This prevents the APS from impairing the usability for a user.

In the portable computing device 1 according to the above embodiment, the display-side chassis 11 was rotatable with respect to the body-side chassis 12 by 360 degrees about the X axis. The present embodiments, however, are not limited thereto. It is also applicable, for example, to a convertible type portable computing device which has its display-side chassis 11 rotatable with respect to its body-side chassis 12 by at least 180 degrees about the Z axis and at least 180 degrees about the X axis.

Figure 9A:
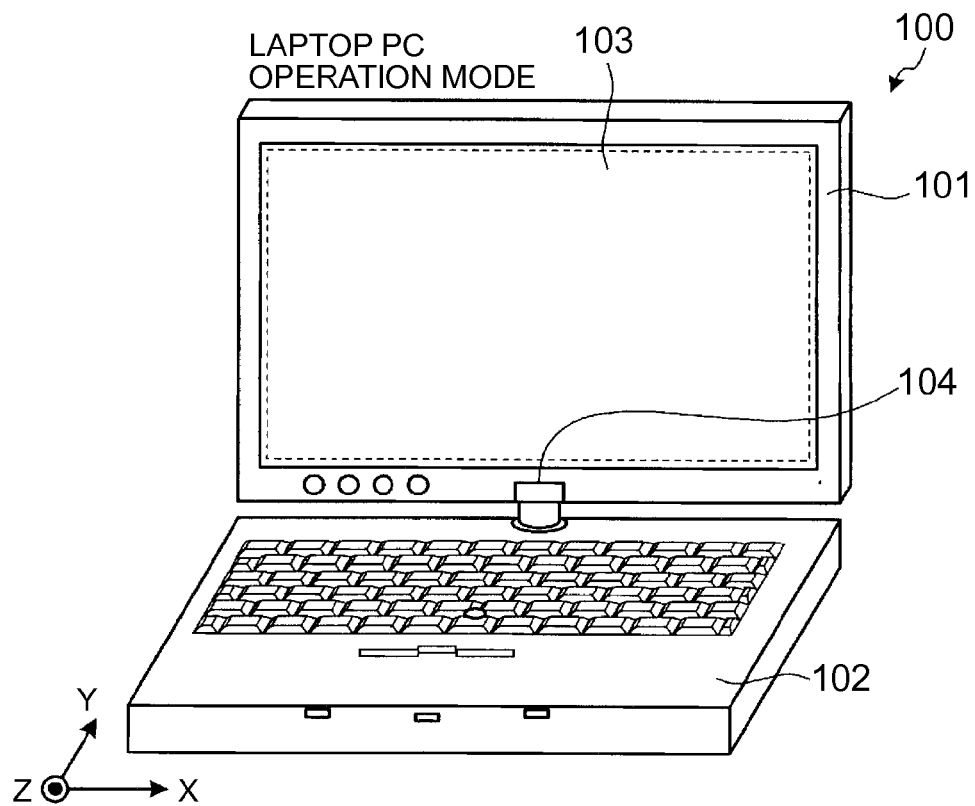
FIGS. 9A to 9C illustrate the external configuration of a portable computing device according to one aspect.
Figure 9B:
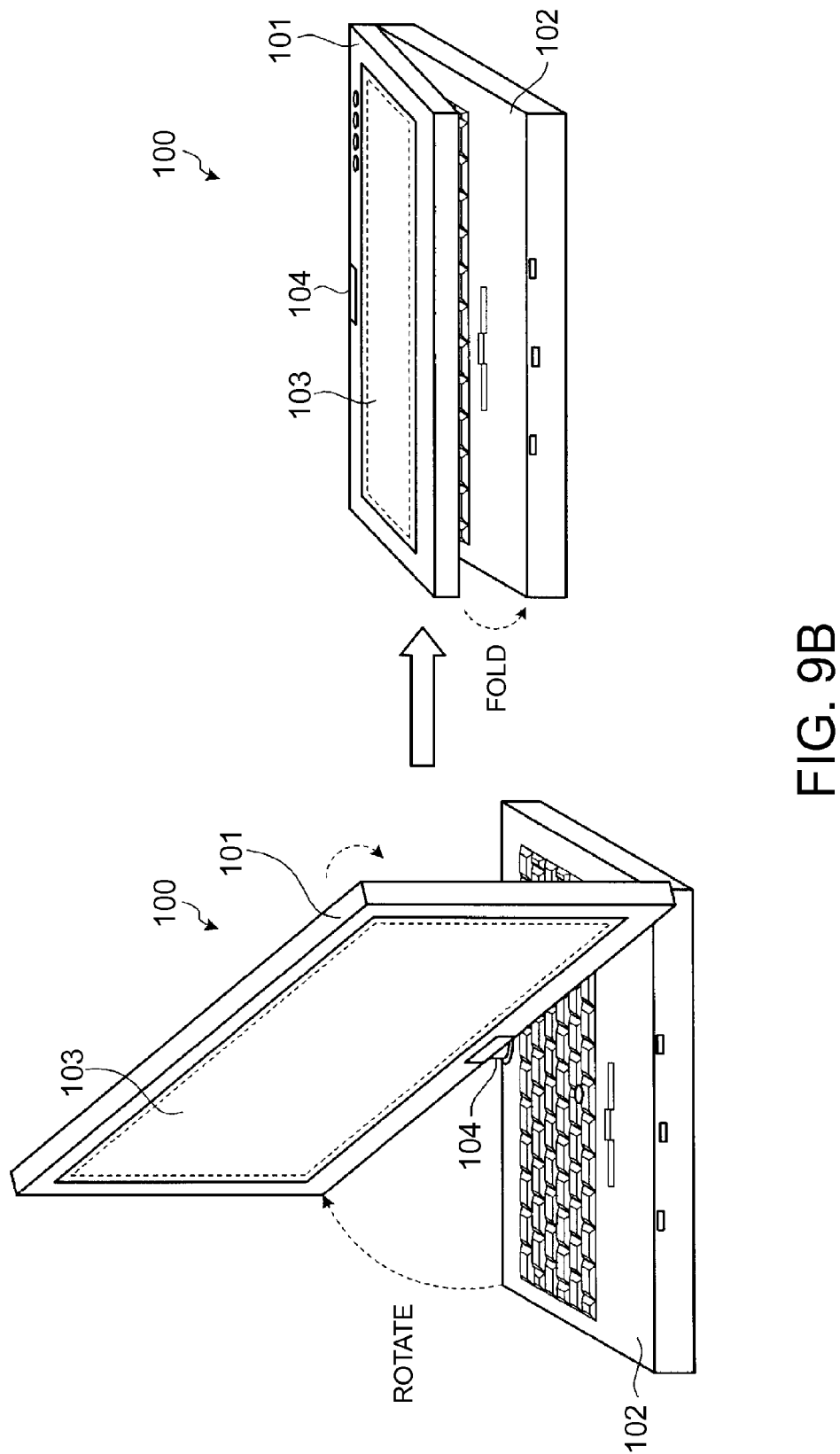
Figure 9C:
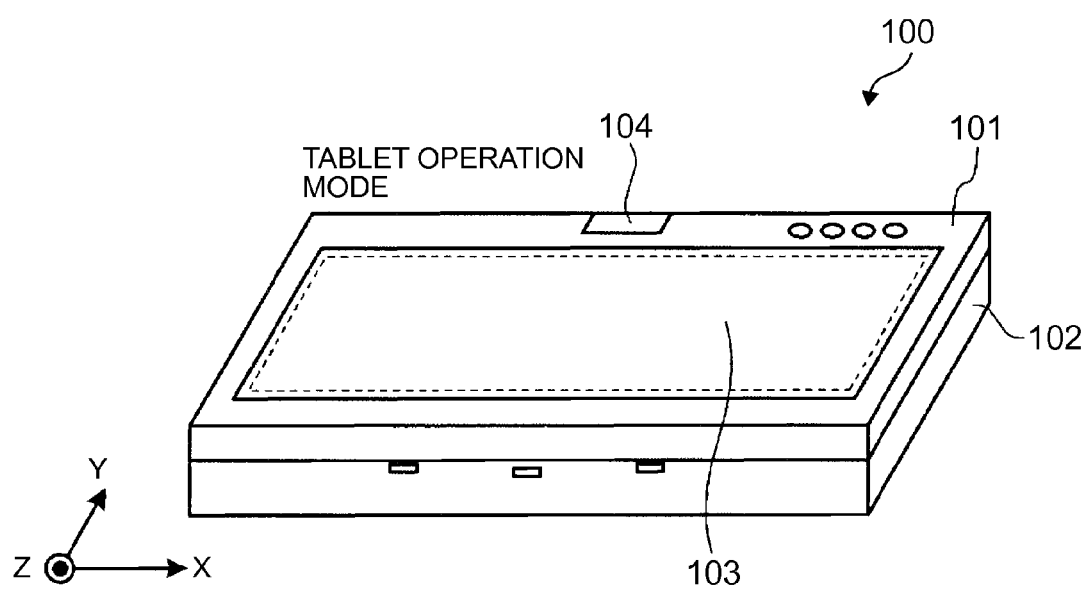

FIGS. 9A to 9C schematically show external views of a portable computing device 100 according to a first modification. As shown in FIG. 9A, the portable computing device 100 is of a convertible type, and includes a display-side chassis 101, with a touch screen 103 disposed therein, and a body-side chassis 102, with a keyboard disposed therein. The body-side chassis 102 and the display-side chassis 101 have their ends joined approximately at the center by a coupling section 104. The coupling section 104 is rotatable in a direction in which the chassis are opened and closed with respect to each other. Further, in the state where the display-side chassis 101 is open with respect to the body-side chassis 102, the display-side chassis 101 can be rotated by at least 180 degrees.

The portable computing device 100 can be used as an ordinary laptop PC in a laptop PC operation mode shown in FIG. 9A. Further, as shown in FIG. 9B, when the coupling section 104 is rotated and the display-side chassis 101 is folded and stuck on the body-side chassis 102 to make the touch screen 103 face front, then the portable computing device 100 enters a tablet operation mode shown in FIG. 9C. In the case of the portable computing device 100, when it is used in the tablet operation mode, the keyboard surface of the body-side chassis 102 is hidden under the display-side chassis 101, hindering the use of the keyboard. In this case, it is not possible to determine the user's device-holding state in accordance with an input to the keyboard. In every other respect, the APS control identical to that in the portable computing device 1 of the above embodiment can be carried out in the portable computing device 100 of the first modification.

The portable computing device 1 of the above embodiment was a convertible type portable computing device. The present embodiments however are not limited thereto; it is also applicable to an ordinary tablet PC.

Figure 10:
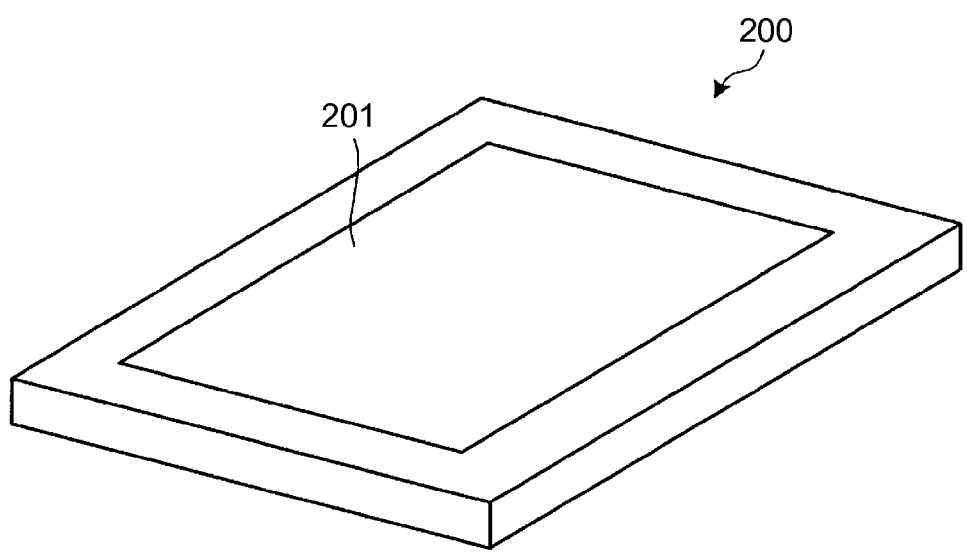
FIG. 10 illustrates the external configuration of a portable computing device according to a further aspect.

FIG. 10 schematically shows an external view of a portable computing device 200 according to a second modification. As shown in FIG. 10, the portable computing device 200 is an ordinary tablet PC and includes a touch screen 201. In the case of the portable computing device 200, it is not possible to determine the user's device-holding state in accordance with an input to a keyboard. In every other respect, the APS control identical to that in the tablet PC mode of the portable computing device 1 of the above embodiment can be carried out in the portable computing device 200 of the second modification.

INDUSTRIAL APPLICABILITY

As described above, the portable computing device and the method and computer-executable program for protecting its magnetic disk unit are useful in a tablet PC equipped with a magnetic disk unit, for protecting the magnetic disk unit from impacts.

What is claimed is:

1. A portable computing device, comprising:
   a magnetic disk unit of a portable computing device;
   a shock prediction module that predicts an occurrence of an impact to the portable computing device;
   a magnetic disk unit protecting module that carries out a magnetic disk unit protecting function that retracts a head of the magnetic disk unit in response to the shock prediction module predicting the occurrence of an impact; and
   a detecting module that detects whether a user is holding the portable computing device or not;
   wherein the magnetic disk unit protecting module, in response to the detecting module detecting that the user is holding the portable computing device while the shock prediction module predicts the occurrence of an impact and after the magnetic disk unit protecting module initializes the magnetic disk unit protecting function and the head of the magnetic disk unit begins to retract, temporarily deactivates the magnetic disk unit protecting function for a prescribed period, cancels the retraction of the head of the magnetic disk unit, and after a lapse of the prescribed period, activates the magnetic disk unit protecting function.

2. The portable computing device of claim 1, wherein the detecting module includes a contact-type proximity sensor arranged in a chassis of the portable computing device and, in response to the proximity sensor detecting a contact by the user, the detecting module determines that the user is holding the portable computing device.

3. The portable computing device of claim 1, wherein the detecting module includes a touch screen and, in response to the touch screen detecting a contact by the user, determines that the user is holding the portable computing device.

4. The portable computing device of claim 1, wherein the detecting module includes a keyboard and, in response to detection of an input to the keyboard, determines that the user is holding the portable computing device.

5. The portable computing device of claim 1, wherein the magnetic disk unit protecting module differentiates conditions for carrying out the magnetic disk unit protecting function between the case where the processor is used as the laptop PC and the case where the processor is used as the tablet PC.

6. The portable computing device of claim 5, further comprising a detecting section that is operable, when the processor is used as the tablet PC, to detect whether a user is holding the portable computing device or not, wherein
   when the processor is used as the laptop PC, the magnetic disk unit protecting module keeps the magnetic disk unit protecting function active constantly, and
   when the processor is used as the tablet PC, in the case where the detecting section detects that the user is holding the portable computing device, the magnetic disk unit protecting module temporarily deactivates the magnetic disk unit protecting function.

7. The portable computing device of claim 5, wherein the detecting module determines whether the user is holding the portable computing device or not, on the basis of a detection result of at least one of a proximity sensor, a touch screen, and a keyboard.

8. A method comprising:
   predicting an occurrence of an impact to a portable computing device;
   responsive to predicting an occurrence of an impact, carrying out a magnetic disk unit protecting function that retracts a head of the magnetic disk unit of a portable computing device; and
   detecting whether a user is holding the portable computing device or not;
   wherein in the case where it is detected that the user is holding the portable computing device while the occurrence of an impact is predicted and after the magnetic disk unit protecting function is initialized and the head of the magnetic disk unit has begun to retract, temporarily deactivating the magnetic disk unit protecting function for a prescribed period, cancelling the retraction of the head of the magnetic disk unit, and after a lapse of the prescribed period, activating the magnetic disk unit protecting function, and after activating the magnetic disk unit protecting function after cancelling the retraction of the head of the magnetic disk unit and the lapse of the prescribed period, detecting that the user is holding the portable device and detecting that the occurrence of the impact is predicted and maintaining the magnetic disk unit protecting function active until detecting that the occurrence of the impact is not predicted.

9. The method of claim 8, wherein the magnetic disk unit protecting function differentiates between the case where the processor is used as a laptop PC and the case where the processor is used as a tablet PC.

10. The method of claim 8, further comprising in response to a proximity sensor detecting a contact by the user, determining that the user is holding the portable computing device.

11. The method of claim 8, further comprising in response to a touch screen detecting a contact by the user, determining that the user is holding the portable computing device.

12. The method of claim 8, further comprising in response to detection of an input to the keyboard, determining that the user is holding the portable computing device.

13. The method of claim 8, further comprising differentiating conditions for carrying out the magnetic disk unit protecting function between the case where the processor is used as the laptop PC and the case where the processor is used as the tablet PC.

14. The method of claim 13, further comprising detecting, when the processor is used as the tablet PC, whether a user is holding the portable computing device or not, wherein
   when the processor is used as the laptop PC, keeping the magnetic disk unit protecting function active constantly, and
   when the processor is used as the tablet PC, in response to detecting that the user is holding the portable computing device, temporarily deactivating the magnetic disk unit protecting function.

15. The method of claim 13, wherein determining whether the user is holding the portable computing device or not comprises receiving a detection result of at least one of a proximity sensor, a touch screen, and a keyboard.

16. A program product comprising a non-transitory computer readable storage medium that stores code executable by a processor, the executable code comprising code to perform:
   predicting an occurrence of an impact to a portable computing device;
   responsive to predicting an occurrence of an impact, carrying out a magnetic disk unit protecting function that retracts a head of the magnetic disk unit of a portable computing device; and detecting whether a user is holding the portable computing device or not;

wherein in the case where it is detected that the user is holding the portable computing device while the occurrence of an impact is predicted and after the magnetic disk unit protecting function is initialized and the head of the magnetic disk unit has begun to retract, temporarily deactivating the magnetic disk unit protecting function for a prescribed period, cancelling the retraction of the head of the magnetic disk unit, and after a lapse of the prescribed period, activating the magnetic disk unit protecting function.

17. The program product of claim 16, the executable code further comprising code to perform:

causing a computer to perform a magnetic disk unit protecting operation that, responsive to predicting an occurrence of an impact, carries out a magnetic disk unit protecting function for retracting a head of the magnetic disk unit, and in the magnetic disk unit protecting function differentiating between the case where the processor is used as a laptop PC and the case where the processor is used as a tablet PC.

18. The portable computing device of claim 6, further comprising a queue module that queues commands for the magnetic disk unit while the magnetic disk unit protecting function is being carried out for subsequent transmission.

* * * * *